United States Patent
Kim et al.

(10) Patent No.: US 10,414,430 B2
(45) Date of Patent: Sep. 17, 2019

(54) METHOD OF CONTROLLING MOTOR DRIVEN POWER STEERING SYSTEM

(71) Applicant: HYUNDAI MOBIS CO., LTD., Seoul (KR)

(72) Inventors: Tae Hong Kim, Seongnam-si (KR); Do Young Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 166 days.

(21) Appl. No.: 15/439,795

(22) Filed: Feb. 22, 2017

(65) Prior Publication Data

US 2017/0240201 A1  Aug. 24, 2017

(30) Foreign Application Priority Data

Feb. 22, 2016  (KR) ........................ 10-2016-0020490

(51) Int. Cl.
*B62D 5/04* (2006.01)
*B62D 15/02* (2006.01)
(Continued)

(52) U.S. Cl.
CPC .............. *B62D 5/0472* (2013.01); *B62D 3/12* (2013.01); *B62D 6/04* (2013.01); *B62D 6/06* (2013.01); *B62D 6/10* (2013.01); *B62D 15/02* (2013.01)

(58) Field of Classification Search
CPC ........ B62D 3/12; B62D 3/126; B62D 5/0421; B62D 5/0457; B62D 5/0463;
(Continued)

(56) References Cited

U.S. PATENT DOCUMENTS

| 2011/0010049 A1* | 1/2011 | Champagne ......... B62D 5/0469 701/41 |
| 2011/0010053 A1* | 1/2011 | Champagne ......... B62D 5/0469 701/42 |

(Continued)

FOREIGN PATENT DOCUMENTS

| JP | 2006001329 A * 1/2006 |
| JP | 2009029285 A * 2/2009 |

(Continued)

OTHER PUBLICATIONS

Office Action dated Jun. 6, 2017 in corresponding Korean Patent Application No. 10-2016-0020490—7 pages.

*Primary Examiner* — Thomas G Black
*Assistant Examiner* — Ce Li Li
(74) *Attorney, Agent, or Firm* — Knobbe Martens Olson & Bear LLP

(57) ABSTRACT

Disclosed is a method of control a motor driven power steering system. The method includes determining an end holding driving, by a control unit, turning on/off a damping boost gain application mode according to a result of determination for the end holding driving, by the control unit, multiplying an output value according to turning on/off of the damping boost gain application mode by an output value from the damping output value detection unit, and outputting the multiplied value as a damping correction value, by the control unit, and reflecting the damping correction value to control an output torque of a motor in a rack-end-stop control period, by the control unit.

2 Claims, 3 Drawing Sheets

(51) Int. Cl.
    *B62D 6/04*    (2006.01)
    *B62D 6/10*    (2006.01)
    *B62D 6/06*    (2006.01)
    *B62D 3/12*    (2006.01)

(58) Field of Classification Search
    CPC .... B62D 5/0469; B62D 5/0472; B62D 5/049;
            B62D 5/0493; B62D 6/002; B62D 6/003;
            B62D 6/008; B62D 6/02; B62D 6/04;
            B62D 6/06; B62D 6/10; B62D 15/02;
            B62D 15/0245
    See application file for complete search history.

(56) References Cited

U.S. PATENT DOCUMENTS

2012/0232754 A1* 9/2012 Champagne ......... B62D 5/0469
                                                    701/41
2016/0096545 A1* 4/2016 Nakakuki ............ B62D 5/0469
                                                    701/41

FOREIGN PATENT DOCUMENTS

JP        2009220735 A  * 10/2009
KR         10-0247334 B1    4/2000
KR      10-2015-0055982 A   5/2015

* cited by examiner

METHOD OF CONTROLLING MOTOR DRIVEN POWER STEERING SYSTEM

CROSS-REFERENCE TO RELATED APPLICATION

The present application claims priority under 35 U.S.C 119(a) to Korean Application No. 10-2016-0020490, filed on Feb. 22, 2016, which is herein incorporated by reference in its entirety.

BACKGROUND

1. Technical Field

Various embodiments of the present disclosure relate to a method of controlling a motor driven power steering system, and more particularly, to a method of controlling a motor driven steering system, when a driver steers a steering wheel to one side (left or right) end of a steering wheel and then, in a state in which all the steering related systems (e.g., machinery, tires, etc.) are twisted to the end, re-steers to the end of the same direction, that can reduce the additional amount of impact generated at the time of re-steering to protect the mechanical system and reduce the impact noise.

2. Related Art

In general, a hydraulic power steering system that forms a hydraulic pressure in a hydraulic pump and assists the assistive steering force, and a motor driven power steering system (hereinafter, referred to as "MDPS") that assists the assistive steering force using a driving torque of an electric motor have been used as an auxiliary power steering system for reducing the assistive steering force of a driver at the time of steering a vehicle.

Such a motor driven power steering system employs a rack-end-stop logic or soft-end-lock logic which reduce the amount of impact generated when the driver steers to the ends.

However, in the conventional rack-end-stop (soft-end-lock) logic, there is a problem that a steering noise and impact, and a sense of heterogeneity are generated by the tire or the mechanical elasticity characteristics (i.e., the inertia characteristic which tends to return to the state where the steering wheel is twisted to the end at the steering end after the reverse steering after being already twisted to the end) when steering is performed at one end (i.e., the left end or the right end) of the steering angle and then steering to the end or the running direction (i.e., the right end or the left end).

In addition, in the conventional rack-end-stop (soft-end-lock) logic, when an output limit value tuned on the basis of the normal road surface condition is applied to a high friction road surface, there is a problem that a sense of heterogeneity is generated due to the lack of output as the end output is limited, on the other hand, when the output limit value tuned on the basis of the normal road surface condition is applied to a low friction road surface, the output limit value becomes insufficient and the rack-end-stop logic (or an output limit logic) is not operated properly, therefore, an end impact noise and a sense of heterogeneity are generated.

The related art of the present invention is disclosed in Korean Patent Registration No. 10-0247334 registered on Dec. 10, 1999 and entitled "A motor driven power steering system".

SUMMARY

According to an aspect of the present disclosure, the present disclosure has been made to solve the above problems, and to provide a method of controlling a motor driven power steering system, when a driver steers to one side (left or right) end of a steering wheel and then, in a state in which all the steering related systems (e.g., machinery, tires, etc.) are twisted to the ends, re-steering to end of the same direction, that can reduce the additional amount of impact generated at the time of re-steering to protect the mechanical system and reduce the impact noise.

According to another aspect of the present disclosure, the present disclosure has been made to provide a method of controlling a motor driven power steering system that can determine a low friction road surface and a high friction road surface, and vary the output limit value of the rack-end-stop logic according to the road surface, thereby, improving the end steering feeling.

A method of controlling a motor driven power steering system according to an aspect of the present disclosure includes: determining an end holding driving, by a control unit; turning on/off a damping boost gain application mode according to a result of determination for the end holding driving, by the control unit; multiplying an output value according to turning on/off of the damping boost gain application mode by an output value from the damping output value detection unit, and outputting the multiplied value as a damping correction value, by the control unit; and reflecting the damping correction value to control an output torque of a motor in a rack-end-stop control period, by the control unit.

In an embodiment of the present disclosure, the end holding driving is a driving operation in which a driver operates the steering wheel in a full turn in any one direction.

In an embodiment of the present disclosure, the control unit determines the end holding driving on the basis of at least one information among a vehicle speed, a rack bar position, and a rack bar position learned and output in a learning unit, and the learning unit learns a maximum position of the rack bar.

In an embodiment of the present disclosure, when driving after end holding steering, the control unit turns on the damping boost gain application mode, and then, outputs a damping boost gain value calculated in consideration of at least one of a steering angle, an initial position of the rack bar, and a steering speed.

In an embodiment of the present disclosure, when the end holding steering driving is not performed, the controller turns off the damping boost gain application mode, and then, outputs '1' as the damping boost gain value, thereby practically, enabling the damping boost gain value not to be applied.

A method of controlling a motor driven power steering system according to another aspect of the present disclosure includes: determining a friction state of a road surface, by a control unit; and as a result of determination, if the road surface is in a high friction mode, turning off an output limit, if the road surface is in a medium friction mode, applying an existing output limit value outputted according to a predetermined rack-end-stop function, and if the road surface is in a low friction mode, applying an additional output limit value, by the control unit, to control the output torque of the motor at a rack-end-stop control period.

In an embodiment of the present disclosure, the control unit detects the friction of the current road surface on the basis of at least one information among a rack bar position, a rack bar speed, a rack bar position learned and output from a learning unit, and an output control value to which the rack-end-stop function is applied according to an existing method from the output control value detection unit, and the learning unit learns a maximum position of the rack bar.

In an embodiment of the present disclosure, after learning an end rack bar position through the learning unit, the control unit determines a high, medium, low friction modes depending on a threshold value depending on a rack speed and a rack thrust at an ⓐ (end angle-β) point, and re-determines the high, medium, low friction modes depending on the rack thrust at ⓑ (end angle-γ) point, and determines the final friction mode of the road surface according to whether the two points ⓐ and ⓑ satisfy current condition and tilt pattern predetermined according to the high, medium, and low friction modes.

In an embodiment of the present disclosure, the turning off the output limit comprises turning off the output limit or raising the limit value, by the control unit, so as not to apply the current, since the road surface is already in a state of being sufficiently restricted by high friction.

In an embodiment of the present disclosure, the applying the additional output limit value comprises applying the additional output limit value, by the control unit, so as to apply less current than when the friction is medium, since the friction of the road surface is less than that of the medium friction.

BRIEF DESCRIPTION OF THE DRAWINGS

Various embodiments of an inventive concept will become more apparent in view of the attached drawings and accompanying detailed description, in which.

DETAILED DESCRIPTION OF THE EMBODIMENTS

Embodiments of a method of controlling a motor driven power steering system according to the present disclosure will hereinafter be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
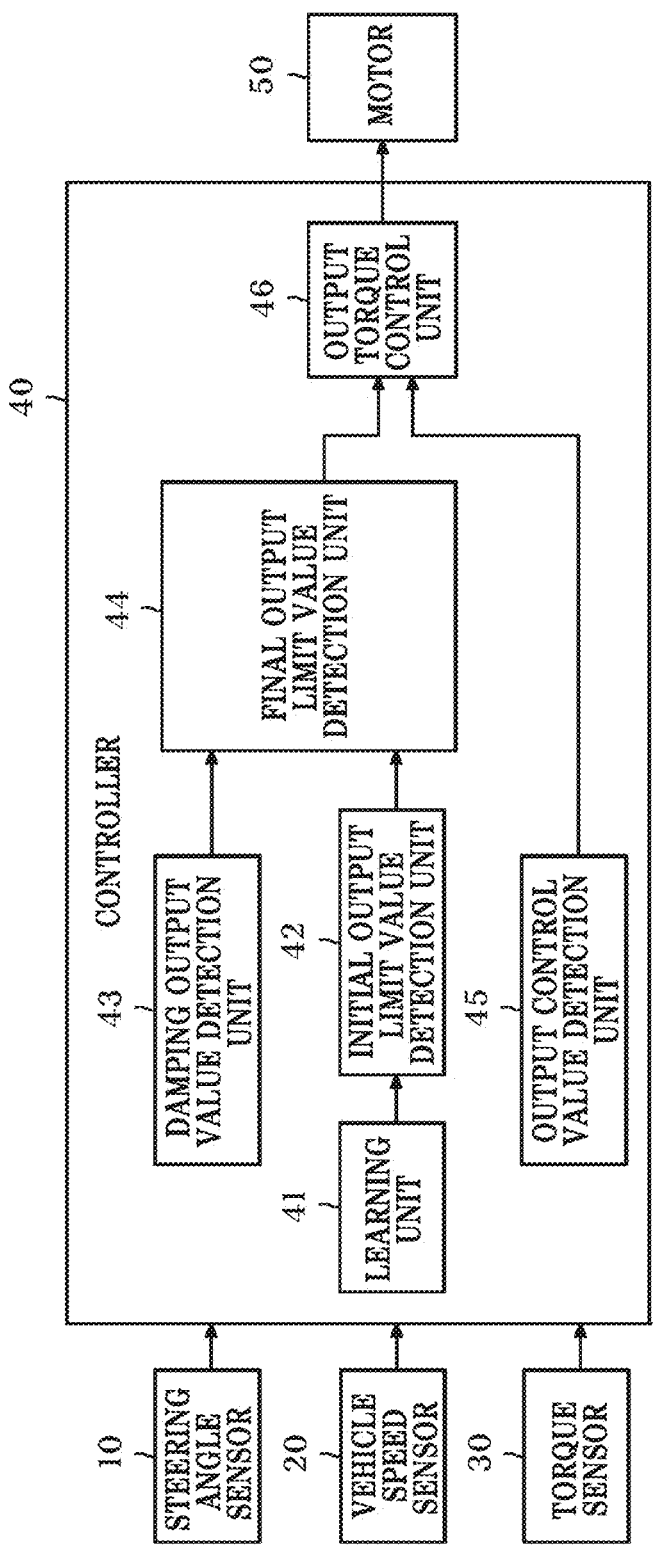
FIG. 1 is an exemplary diagram illustrating a schematic configuration of a control device of a motor driven power steering system according to an embodiment of the present disclosure.

FIG. 1 is an exemplary diagram illustrating a schematic configuration of a control device of a motor driven power steering system according to an embodiment of the present disclosure.

As illustrated in FIG. 1, the control device of a motor driven power steering system according to an embodiment of the present disclosure may include a steering angle sensor 10, a vehicle speed sensor 20, a torque sensor 30, a controller 40, and a motor 50.

In this embodiment, a motor driven power steering system (hereinafter, referred to as "MDPS") that assists the assistive steering force using a driving torque of an electric motor may be employed as the motor driven power steering system. The MDPS of the embodiment may be applied to a column driving mode MDPS (C-MDPS) in which the motor 50 is combined with a steering shaft (not illustrated), a pinion driving mode MDPS (P-MDPS) in which the motor 50 is combined with a pinion gear of a handle shaft (not illustrated), and a rack driving mode MDPS (R-MDPS) in which the motor 50 is combined with a rack gear (not illustrated).

For reference, the rack driving mode MDPS (R-MDPS) will be described as an example in this embodiment.

Generally, the rack driving mode is a driving mode to receive a driving torque by the motor 50 and to implement a shaft direction movement of a rack bar (not illustrated). The rotation force of the motor 50 is converted into a straight movement force of a shaft direction of the rack bar. To this end, a belt, a pulley, ball nuts, bearings, a ball screw type rack bar, or the like may be used. In other words, the ball nuts are combined with the rack bar in a state rotatably supported by the bearing inside a decelerator, and a driving pulley is fixed to a driving shaft of the motor 50 and a driven pulley is fixed to the ball nuts combined with the rack bar to transfer the rotation force. The driving pulley of the motor 50 side and the driven pulley of the ball nut side are connected to each other by the belt, and the rotation force of the motor 50 is transferred to the rack bar through the pulley and belt. At this time, the rotation force of the motor 50 is converted into the straight movement force of the rack bar by a ball screw structure of the ball nut and rack bar.

The torque sensor 30 detects a steering torque of a steering wheel (not illustrated) and inputs the detected steering torque to the controller 40.

The steering angle sensor 10 detects a steering angle of the steering wheel and inputs the detected steering angle to the controller 40.

The vehicle speed sensor 20 senses the speed of the vehicle and inputs the sensed speed of the vehicle to the controller 40.

The controller 40 detects an output control value according a predetermined output control value output logic of the motor driven power steering system using a steering torque, a steering angle, a vehicle speed which are inputted from each of the torque sensor 30, the steering angle sensor 10 and the vehicle speed sensor 20, respectively, a steering angle speed detected based on the steering angle or a lack movement speed detected through a motor rotation speed, determines a rack-end-stop control period on the basis of the current position of the rack bar, and controls an output torque of the motor 50 on the basis of the detected rack-end-stop control period.

The controller 40 may include an output control value detection unit 45, a leaning unit 41, an initial output limit value detection unit 42, a damping output value detection unit 43, a final output limit value detection unit 44, and an output torque control unit 46.

Generally, when the driver fully turns the steering wheel, the rack-end-stop function minimizes the impact between the stopper of the rack bar and the IBJ socket (housing) of a gear box by reducing the output torque of the motor 50 to limit the current applied to the motor 50. The rack-end-stop control period for this purpose is the position range of the rack bar just before the collision between the stopper of the rack bar and the IBJ socket (housing) of the gear box as described above.

Accordingly, when the rack bar enters the rack-end-stop control period, the controller 40 limits the output torque of the motor 50 to minimize the impact due to the collision between the stopper of the rack bar and the IBJ socket (housing) of the gear box, thereby reducing a noise due to the impact and preventing mechanical damage of components.

The rack-end-stop control period may be determined on the basis of the maximum position of the rack bar.

For example, if the maximum position of the rack bar is determined to '−77 to +77' in the left and right directions, the rack-end-stop control period is changed from '−77 to −70' and '+70 to +77' with respect to each steering direction. In this case, when the current position of the rack bar enters '−77 to −70' or '+70 to +77', the controller 40 minimizes the impact between the stopper of the rack bar and the IBJ socket (housing) of the gear box by limiting the output torque outputted to the motor 50.

Meanwhile, the rack-end-stop control period is determined on the basis of the maximum position of the rack bar as described above. The maximum position of the rack bar may be different from a target value due to hardware differences such as the length of the gear box rack bar, the left and right steering angles distribution or the like.

Accordingly, when the driver makes a full turn of the steering wheel, the controller 40 newly detects the maximum position of the rack bar on the basis of the current position of the rack bar, learns the rack-end-stop control period on the basis of the detected maximum position of the rack bar, and controls the output torque of the motor 50 on the basis of the newly learned rack-end-stop control period when the current position of the rack bar re-enters the rack-end-stop control period.

To this end, the learning unit 41 detects the current position of the rack bar and compares the current position of the rack bar and a predetermined maximum position of the rack bar to update the maximum position of the rack bar according to the result of comparison.

Here, the maximum position of the rack bar may be the initial value predetermined at the time of manufacture as described above, but may also include the maximum position of the rack bar previously detected in the driver's steering process.

Meanwhile, if the current position of the rack bar exceeds the maximum position of the rack bar as a result of comparing the current position of the rack bar and the predetermined maximum position of the rack bar, the learning unit 41 updates the maximum position of the rack bar to the current position of the rack bar.

In this case, the learning unit 41 determines the rack-end-stop period using the updated maximum position of the rack bar. At this time, the learning unit 41 shifts the rack-end-stop control period by the difference between the current position of the rack bar and the maximum position of the rack bar. In this case, the learning unit 41 shifts the entry position and the end position of the rack-end-stop control period by the difference value, respectively.

Such a rack-end-stop control period is determined in the left steering direction and the right steering direction, respectively, and whenever the driver steers the steering wheel in the left direction or right direction so that the current position of the rack bar exceeds the maximum position of the rack bar, the learning unit 41 determines the rack-end-stop control period independently for each of the left steering direction and the right steering direction.

The initial output limit value detection unit 42 detects the current position and movement speed of the rack bar as described above, and detects the initial output limit value using the current position and movement speed of the rack bar. In addition, the initial output limit value detection unit 42 detects a predetermined vehicle speed gain corresponding to the speed of a vehicle, and then, compensates the initial output limit value. Here, the initial output limit value may be configured to a two-dimensional look-up table according to the current position and movement speed of the rack bar.

The damping output value detection unit 43 detects a damping output value using at least one of a steering speed, a rotation speed of the motor 50 or a movement speed of the rack bar. In this case, the damping output value is predetermined with respect to the steering speed, the rotation speed of the motor 50 or the movement speed of the rack bar. Here, the damping output value is used to detect the final output limit value by correcting the initial output limit value.

The final output limit value detection unit 44 receives the initial output limit value and the damping output value from the initial output limit value detection unit 42 and the damping output value detection unit 43, and detects the final output limit value using the initial output limit value and the damping output value.

In this case, the final output limit value detection unit 44 subtracts the damping output value from the initial output limit value to detect the final output limit value. In this case, if the damping output value is relatively greater than the initial output limit value, the final output limit value may be a negative (−) value.

Here, if the final output limit value is a positive (+) value, the output of the motor driven power steering system is limited, and if the final output limit value is a negative (−) value, the output is opposite to the output direction of the motor driven power steering system.

The output control value detection unit 45 detects an output control value according to a predetermined output control value output logic of the motor driven power steering system using the steering torque, steering angle, vehicle speed inputted from the torque sensor 30, the steering angle sensor 10, and the vehicle speed sensor 20 and the steering angle speed detected using the steering angle.

Here, the output control value detection unit 45 detects the output control value according to the existing output control value output logic of the motor driven power steering system, and detects the output control value applied with the rack-end-stop function according to the existing method. At this time, the output control value output logic of the motor driven power steering system is generally employed in the motor control of the motor driven power steering system, and a detailed description thereof will be omitted here.

The output torque control unit 46 receives a final output limit value and output control value from the final output limit value detection unit 44 and the output control value detection unit 45, respectively, compares the final output limit value and output control value, and control the motor 50 on the basis of the final output limit value and output control value according to the result of the comparison.

In other words, the output torque control unit 46 compares the final output limit value and output control value. The output torque control unit 46 controls the output torque of the motor 50 according to a relatively small value from the final output limit value and the output control value, and, for example, if the final output limit value is less than the output control value, controls the output torque of the motor 50 according to the final output limit value.

Here, limiting the output torque of the motor 50 through the final output limit value or the like can be replaced with limiting the output current of the motor 50.

Furthermore, the steering angle detected by the steering angle sensor 10 or the steering angle detected through the motor rotation angle may be employed instead of the position of the rack bar, and the steering angle speed obtained through the steering angle and the steering angle speed obtained through the motor rotation speed may be employed instead of the movement speed of the rack bar.

As described above, the control device of a motor driven power steering system according to an embodiment of the present disclosure changes the rack-end-stop control period on the basis of the end position of the rack bar, detects the output limit value of the motor driven power steering system on the basis of the changed rack-end-stop control period, and improves the performance difference due to rack bar length mass production scattering.

In addition, the control device of a motor driven power steering system according to an embodiment of the present disclosure reduces impact generated when steering to the end of the steering angle to reduce impact caused by the collision between the stopper of the rack bar and the IBJ socket (housing) of the gear box, reduces the noise caused by impact, and prevents the mechanical damage of the components.

However, such an existing rack-end-stop logic has the following problems. There is a problem in that steering noise is generated due to the elastic characteristic (that is, the characteristic of returning to the center of the steering angle) when the steering wheel is steered to one side end (i.e., the left side end or the right side end) of the steering angle and runs (i.e., the steering system is twisted to the full end), and then the steering wheel is turned to the other side end (i.e., the right end or the left end) after the release. In addition, when the output limit value tuned on the basis of the normal road condition is applied to a high friction road surface, there is a problem that a sense of heterogeneity due to the lack of output occurs because the output of the end is limited. On the contrary, when the output limit value tuned to the normal road surface condition is applied to a low friction road surface, the rack-end-stop logic (or the output limit logic) is not operated properly, which causes noise and a sense of heterogeneity.

Therefore, an embodiment for solving such problems will be described with reference to FIG. 2.

Figure 2:
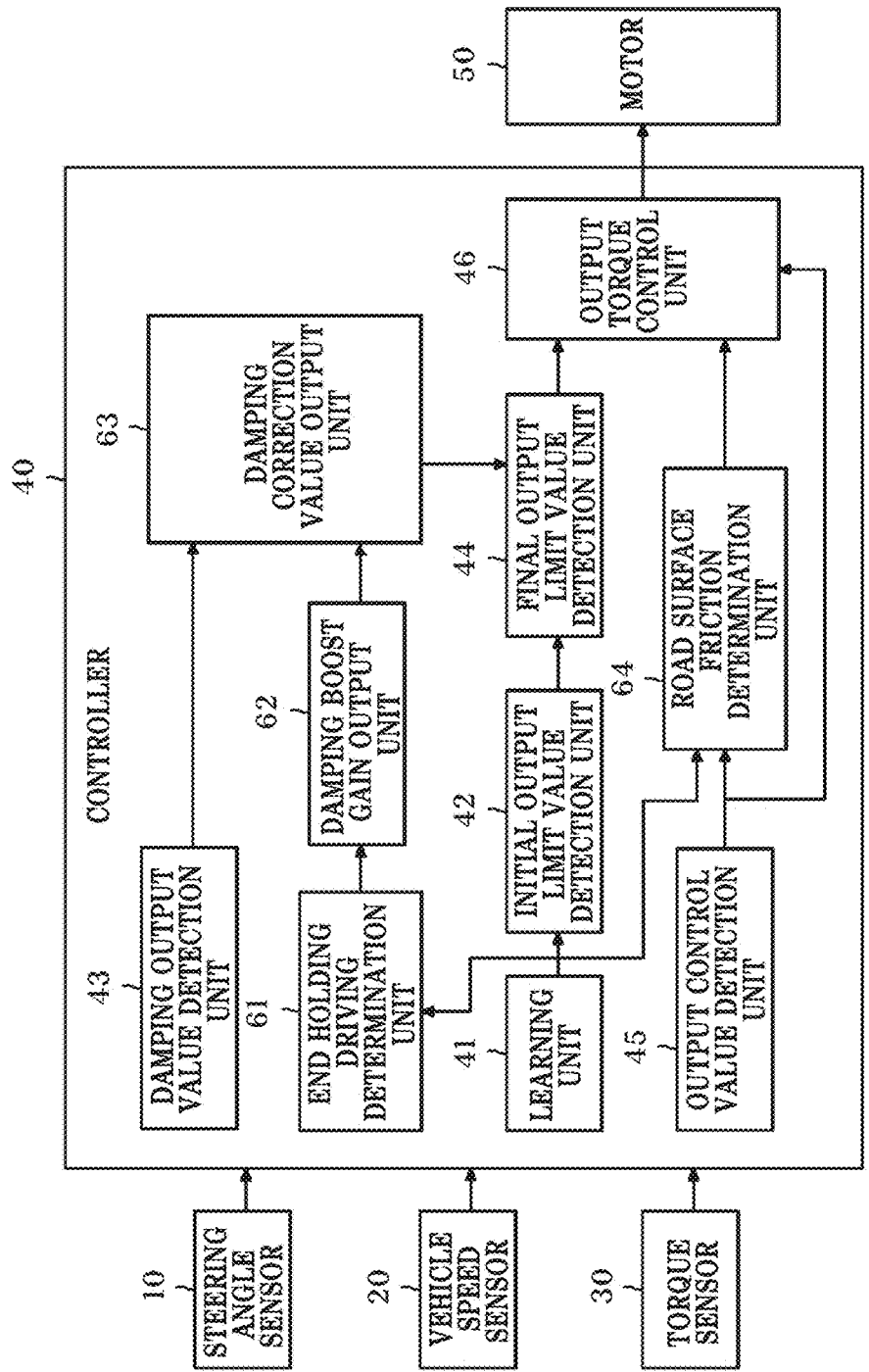
FIG. 2 is an exemplary diagram illustrating a schematic configuration of a control device of a motor driven power steering system according to another embodiment of the present disclosure.

FIG. 2 is an exemplary diagram illustrating a schematic configuration of a control device of a motor driven power steering system according to another embodiment of the present disclosure.

As illustrated in FIG. 2, the control device of a motor driven power steering system according to the embodiment differs in the configuration of the controller 40 shown in FIG. 1, therefore only for the components of the controller 40 will be explained.

The controller 40 further includes an end holding driving determination unit 61, a damping boost gain output unit 62, a damping correction value output unit 63, and a road surface friction determination unit 64.

The end holding driving determination unit 61 determines whether the driver operates the steering wheel in a full turn.

The end holding driving determination unit 61 determines whether the driver operates the steering wheel in a full turn on the basis of at least one among the vehicle speed, the position of the rack bar, and the position of the rack bar learned and outputted from the learning unit 41.

The damping boost gain output unit 62 turns on the damping boost gain application mode at the time of driving after full turn steering according to the determination result of the end holding driving determination unit 61. When the damping boost gain application mode is turned on, the damping boost gain output unit 62 outputs the damping boost gain value calculated regarding to the vehicle speed.

Meanwhile, if the full turn steering operation is not performed, the damping boost gain output unit 62 turns off the damping boost gain applying mode. When the damping boost gain application mode is turned off, the damping boost gain output unit 62 outputs '1' as a damping boost gain value.

The damping correction value output unit 63 multiplies a value output from the damping output value detection unit 43 by a value output from the damping boost gain output unit 62, and outputs the calculated damping correction value.

When the value output from the damping boost gain output unit 62 is '1', the damping correction value output unit 63 outputs the value output from the damping output value detection unit 43 to the final output limit value detection unit 44 as it is, and when the value output from the damping boost gain output unit 62 is not '1', the damping correction value output unit 63 outputs a value obtained by multiplying the value by the value output from the damping boost gain output unit 62 to the final output limit value detection unit 44.

Accordingly, when the driver drives after performing the full turn operation, the final output limit value detection unit 44 can further reduce the existing maximum output limit value (Max) according to application of the damping boost gain.

For example, like a road formed on a cliff, if it is assumed that the vehicle runs on a road formed with a right-left turns period in a form of an S-shape, the driver operates the steering wheel in one direction by the full turn operation, and then operates the steering wheel by the full turn in a direction in which the steering wheel is twisted due to the steering again. At this time, conventionally, steering noises, impact and a sense of heterogeneity were additionally generated according to the elastic characteristic of the steering wheel (that is, characteristic to return to the twisted state). However, in this embodiment, the damping correction value to which the damping boost gain value is applied is output to the final output limit value detection unit 44 so that the existing maximum output limit value (Max) can be further reduced, thereby reducing the steering noise, impact and the sense of heterogeneity.

The road surface friction determination unit 64 determines the friction state of a road.

In other words, the road surface friction determination unit 64 determines the friction of the road on which the vehicle runs on the basis of at least one of a rack bar position (i.e., a rack position), a rack bar speed (i.e., rack speed), a rack bar position learned and output from the learning unit 41, and an output control value to which the rack-end-stop function is applied and outputted according to the existing method.

Figure 3:
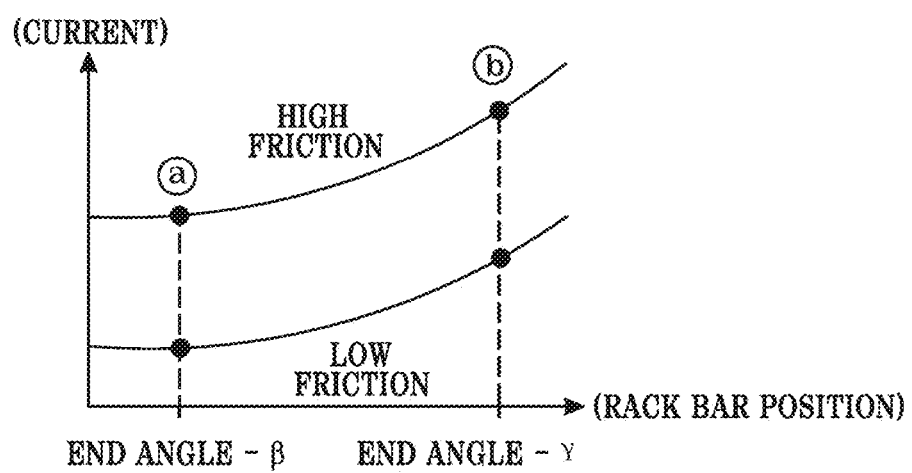
FIG. 3 is a graph showing friction modes determined at an end angle in FIG. 2.

For example, after learning the end rack position (rack bar position) through the learning unit 41, the road surface friction determination unit 64 determines high, medium, and low friction modes according to a threshold value according to the rack speed and the rack thrust at ⓐ (end angle-$\beta$) point (i.e., a previous point by $\beta$ from the end), and re-determines the high, medium, and low friction modes according to the rack thrust at ⓑ (end angle-$\gamma$) point (i.e., a previous point by $\gamma$ from the end) (refer to the graph of FIG. 3).

FIG. 3 is a graph showing the friction mode determined at an end angle in FIG. 2.

In the graph of FIG. 3, the x axis represents the rack bar position and the y axis represents a current value.

Referring to FIG. 3, the road surface friction determination unit 64 applies a second additional determination reference at the end point when changing the road surface load after the mode change at the ⓐ (end angle-β) point.

As only a small torque is required in the case of fine steering at the end when driving on a normal road surface, there may be a problem in that it can be incorrectly determined when determining high or low friction road surface. To prevent this, in the embodiment, if the rising pattern of the torque is maintained up to the second point after determining in the normal steering condition (i.e., specific speed, specific steering angle) by a first point, it is determined to a high or low friction road surface.

Actually, as the steering is made to the end at the time of normal steering, the torque increases. The amount of current is measured under such a condition that the pattern is equal to or less than or equal to or greater than a certain level. If both of the two points (i.e., the first point and the second point) satisfy the predetermined current conditions (e.g., satisfy a tilt rising condition as shown in FIG. 3) and the pattern, the road surface friction determination unit 64 determines to the corresponding friction road surface (for example, a high friction road surface, a medium friction road surface, a low friction road surface).

The road surface friction determination unit 64 turns off the output limit in a high friction mode (i.e., turns off so that the current is not applied since the sufficient restriction is already imposed by the high friction), applies the existing output limit value in a medium friction mode, and applies an additional output limit value in a low friction mode (i.e., applies less current than in the case of the medium friction).

Accordingly, the existing rack-end-stop logic only can reduce the noise generated by the motor control by the amount of the impact generated when the driver steers to the end, and cannot achieve the desired performance in the opposite side steering situation after running on the end, or on the road condition (i.e., low, high friction) not a normal condition (i.e., medium friction).

However, in this embodiment, when the driver drives in the full turn state at an end position predetermined according to the vehicle speed and end learning, the damping amount is further increased in consideration of the torsional elasticity of the tire, thereby improving the noise and the sense of heterogeneity.

In addition, the road surface state is determined whether corresponds to an abnormal road surface (i.e., low and high friction road surface) and the output limit value is changed according to determination, and therefore, the driver can maintain the optimized steering feeling under any conditions.

The embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. A method of control a motor driven power steering (MDPS) system comprising a motor configured to move a rack bar of a vehicle, the method comprising:
    acquiring, using at least one sensor, a driving speed of the vehicle, a steering torque of a steering wheel of the vehicle, a steering angle of the steering wheel, a steering speed of the steering wheel, a rotation speed of the motor, a current position of the rack bar and a movement speed of the rack bar, wherein the rack bar is configured to move between a left end position that corresponds to a full-left turn of the vehicle and a right end position that corresponds to for a full-right turn of the vehicle;
    computing, using at least one controller, an rack-end-stop output value for use in controlling the motor, wherein the rack-end-stop output value is computed using a predetermined rack-end-stop function and based on the steering torque, the steering angle, and the driving speed, wherein the at least one controller is configured to cause the motor to generate a first torque based on the rack-end-stop output value;
    computing, using the at least one controller, an adjusted output limit value for use in controlling the motor, wherein the adjusted output limit value is computed based on the current position of the rack bar, the movement speed of the rack bar and the driving speed and further based on at least one of the steering speed of the steering wheel and the rotation speed of the motor, wherein the at least one controller is configured to cause the motor to generate a second torque based on the adjusted output limit value; and
    controlling the motor to generate either the first torque or the second torque based on the rack-end-stop output value and the adjusted output limit value, wherein the at least one controller is configured to control the motor to produce the first torque based on the rack-end-stop output value when the rack-end-stop output value is less than the adjusted output limit value, wherein the at least one controller controls the motor to produce the second torque based on the adjusted output limit value when the adjusted output limit value is less than the rack-end-stop output value,
    wherein computing the adjusted output limit value comprises:
        computing an initial output limit value based on the current position and the movement speed of the rack bar;
        computing an damping output value based on at least one of the steering speed of the steering wheel, the rotation speed of the motor and the movement speed of the rack bar;
        computing a damping boost gain based on the driving speed;
        applying the damping boost gain to the damping output value to obtain a damping correction value; and
        subtracting the damping correction value from the initial output limit value to obtain the adjusted output limit value,
    wherein when the current position of the rack bar is within a predetermined range from the left end position for a full-left turn or from the right end position for a full-right turn of the vehicle, the damping boost gain is set to be greater than 1 such that the damping correction value is greater than the damping output value in their absolute values,
    wherein when the current position of the rack bar is outside the predetermined range from the left end position and the right end position, the damping boost gain is 1 such that the damping correction value is the same as the damping output value.

2. The method of claim 1, further comprising:
    adjusting the left end position based on the current position of the rack bar when it is determined that the steering wheel is operated for a full-left turn of the vehicle; and adjusting the right end position based on the current position of the rack bar when it is determined that the steering wheel is operated for a full-right turn of the vehicle.

\* \* \* \* \*